US011873847B2

(12) United States Patent
Kanazawa et al.

(10) Patent No.: US 11,873,847 B2
(45) Date of Patent: Jan. 16, 2024

(54) CYLINDER DEVICE

(71) Applicant: FUJIKURA COMPOSITES Inc., Tokyo (JP)

(72) Inventors: Osamu Kanazawa, Saitama (JP); Kenzo Miyamori, Saitama (JP)

(73) Assignee: FUJIKURA COMPOSITES INC., Tokyo (JP)

(*) Notice: Subject to any disclaimer, the term of this patent is extended or adjusted under 35 U.S.C. 154(b) by 99 days.

(21) Appl. No.: 17/299,827

(22) PCT Filed: Dec. 3, 2019

(86) PCT No.: PCT/JP2019/047151
§ 371 (c)(1),
(2) Date: Jun. 4, 2021

(87) PCT Pub. No.: WO2020/116420
PCT Pub. Date: Jun. 11, 2020

(65) Prior Publication Data

US 2022/0003252 A1 Jan. 6, 2022

(30) Foreign Application Priority Data

Dec. 5, 2018 (JP) ................................ 2018-227979

(51) Int. Cl.
*F15B 15/06* (2006.01)
*F15B 15/14* (2006.01)

(52) U.S. Cl.
CPC ........ *F15B 15/1471* (2013.01); *F15B 15/063* (2013.01)

(58) Field of Classification Search
CPC ........... F15B 15/06; F15B 15/063; E21B 6/08
(Continued)

(56) References Cited

U.S. PATENT DOCUMENTS 869,739 A * 10/1907 Sauer ........................ F04D 9/06 417/84
1,846,817 A * 2/1932 Smith, Jr. ................ E21B 6/08 173/97
(Continued)

FOREIGN PATENT DOCUMENTS

GB 2351533 A * 1/2001 .............. F01D 1/34
JP 61-244878 A 10/1986
(Continued)

OTHER PUBLICATIONS

International Search Report for PCT/JP2019/047151 dated Feb. 25, 2020.

*Primary Examiner* — Kenneth Bomberg
*Assistant Examiner* — Michael Quandt
(74) *Attorney, Agent, or Firm* — McCormick, Paulding & Huber PLLC

(57) ABSTRACT

Provided is a cylinder device capable of preventing rotation unevenness while reducing power consumption and achieving compactification in particular. The present invention is to provide a cylinder device including a cylinder body and a shaft member supported in the cylinder body, the cylinder body is provided with a rotation mechanism portion including a rotation chamber and configured to rotate the shaft member based on an action of a fluid, and rotation ports communicating with the rotation chamber are provided at a front end and a rear end of the rotation mechanism portion. Thus, it is possible to prevent rotation unevenness while reducing power consumption and achieving compactification.

5 Claims, 8 Drawing Sheets

(58) Field of Classification Search
USPC ..................................................... 91/61; 92/2
See application file for complete search history.

(56) References Cited

U.S. PATENT DOCUMENTS

| | | | | | |
|---|---|---|---|---|---|
| 2,093,360 | A * | 9/1937 | Jaynes | B24B 23/026 415/202 |
| 3,108,781 | A * | 10/1963 | Saffir | A61C 1/181 415/202 |
| 5,367,943 | A * | 11/1994 | Stoll | F15B 15/063 92/2 |
| 5,577,433 | A * | 11/1996 | Henry | F15B 15/14 91/451 |
| 7,311,036 | B2 * | 12/2007 | Uchino | F16C 29/025 92/165 R |

FOREIGN PATENT DOCUMENTS

| | | | |
|---|---|---|---|
| JP | 2011-069384 | A | 4/2011 |
| JP | 2017-009068 | A | 1/2017 |
| JP | 2017-133593 | A | 8/2017 |

* cited by examiner

CYLINDER DEVICE

CROSS-REFERENCE TO RELATED APPLICATIONS

This application is a National Stage application of International Patent Application No. PCT/JP2019/047151 filed on Dec. 3, 2019, which claims priority to Japanese Patent Application No. JP2018-227979 filed on Dec. 5, 2018, each of which is hereby incorporated by reference in its entirety.

TECHNICAL FIELD OF THE INVENTION

The present invention relates to a cylinder device including a rotation mechanism.

BACKGROUND OF THE INVENTION

The following Patent Literatures disclose cylinder devices including a mechanism configured to rotate a shaft member housed in a cylinder body.

Japanese Patent Laid-Open No. 2011-69384 discloses a rotary drive motor (brushless DC motor) configured to rotate a shaft member.

In Japanese Patent Laid-Open No. 2017-133593, a rotation drive portion is provided to rotate a shaft member at a predetermined angle. The rotation drive portion includes a rotary motor such as a stepping motor or a servo motor.

In Japanese Patent Laid-Open No. 2017-9068, a rotation drive portion is attached to a shaft member. The rotation drive portion includes a rotor and a stator surrounding a periphery of the rotor. A magnet is disposed on the rotor, and a coil is disposed on the stator. The shaft member is rotationally driven by an electromagnetic action.

SUMMARY OF THE INVENTION

However, there are problems that power consumption is increased and compactification cannot be appropriately achieved in the conventional configuration in which the shaft member is rotated by a motor or the like. In other words, heat is generated by use of the motor, and thus power consumption easily increases. Further, since the shaft member is mechanically rotated, a rotation mechanism becomes complicated, and compactification cannot be appropriately achieved. In addition, rotation unevenness is required to be prevented.

The present invention has been made in view of the above circumstances, and has an object to provide a cylinder device capable of preventing rotation unevenness while reducing power consumption and achieving compactification.

The present invention is to provide a cylinder device including: a cylinder body; and a shaft member supported in the cylinder body, wherein the cylinder body is provided with a rotation mechanism portion including a rotation chamber and configured to rotate the shaft member based on an action of a fluid, and at least rotation ports communicating with the rotation chamber are provided at a front end and a rear end of the rotation mechanism portion.

In the present invention, preferably, the rotation ports provided at the front end and the rear end of the rotation mechanism portion, respectively, are used to supply the fluid, and a rotation port communicating with the rotation chamber is provided on an outer circumferential part of the rotation mechanism portion and is used for a fluid discharge. At this time, preferably, a rotating body is connected to the shaft member, the rotating body is disposed in the rotation chamber, and the rotating body includes: a first rotating body that is capable of receiving the fluid supplied from the front end of the rotation mechanism portion to the rotation chamber and is capable of sending the fluid to the rotation port used for the fluid discharge; and a second rotating body that is capable of receiving the fluid supplied from the rear end of the rotation mechanism portion to the rotation chamber and is capable of sending the fluid to the rotation port used for the fluid discharge.

In the present invention, one of the rotation ports provided at the front end and the rear end of the rotation mechanism portion may be used to supply the fluid, and the other rotation port may be used to discharge the fluid. At this time, preferably, a rotating body is connected to the shaft member, the rotating body is disposed in the rotation chamber, and the rotating body has a structure capable of receiving the fluid supplied from one of the rotation ports and allowing the fluid to pass toward the other rotation port.

In the present invention, preferably, the shaft member is supported to be capable of stroke.

In the present invention, preferably, a stroke mechanism portion including a cylinder chamber is divided from the rotation mechanism portion in the cylinder body, and the stroke mechanism portion is provided with a stroke port communicating with the cylinder chamber and allowing the shaft member to be stroked by a supply and discharge of the fluid.

In the present invention, the shaft member preferably includes a fluid bearing, the shaft member being supported in a state of floating in the cylinder body.

According to the cylinder device of the present invention, it is possible to prevent rotation unevenness while reducing power consumption and achieving compactification.

DETAILED DESCRIPTION

Embodiments (hereinafter, abbreviated as "embodiments") of the present invention will be described in detail below.

Figure 1:
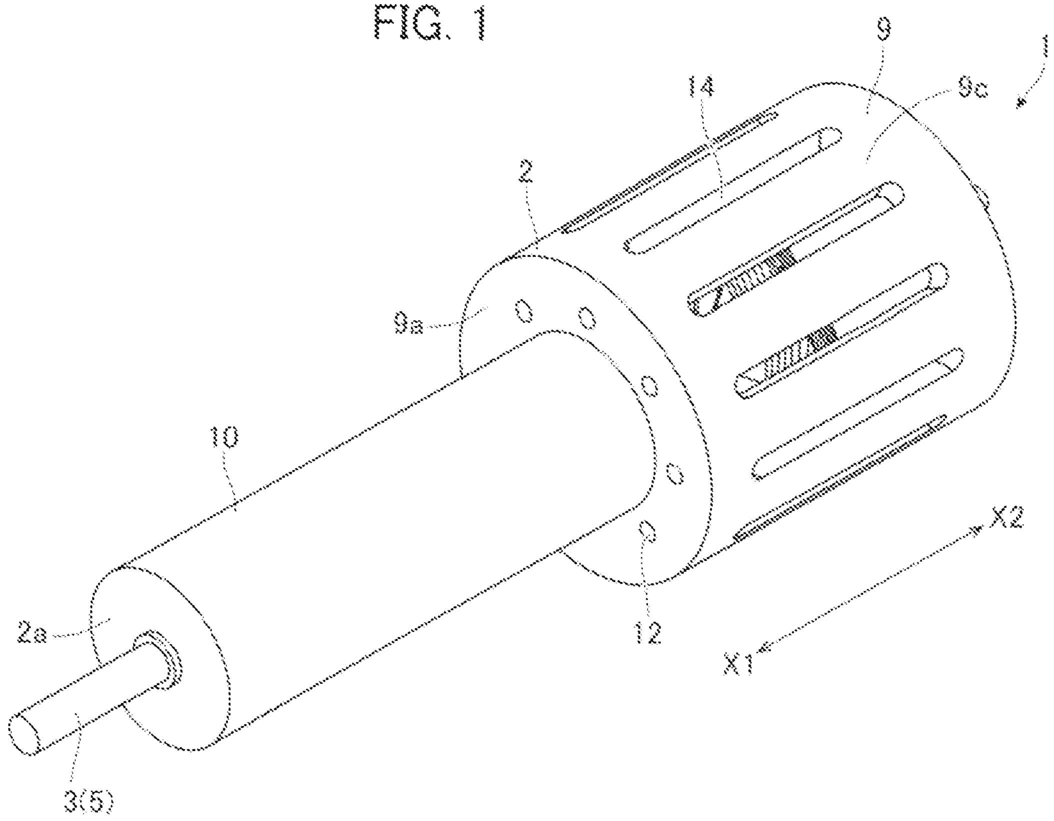
FIG. 1 is an exterior perspective view of a cylinder device according to a first embodiment as viewed from a front side.
Figure 2:
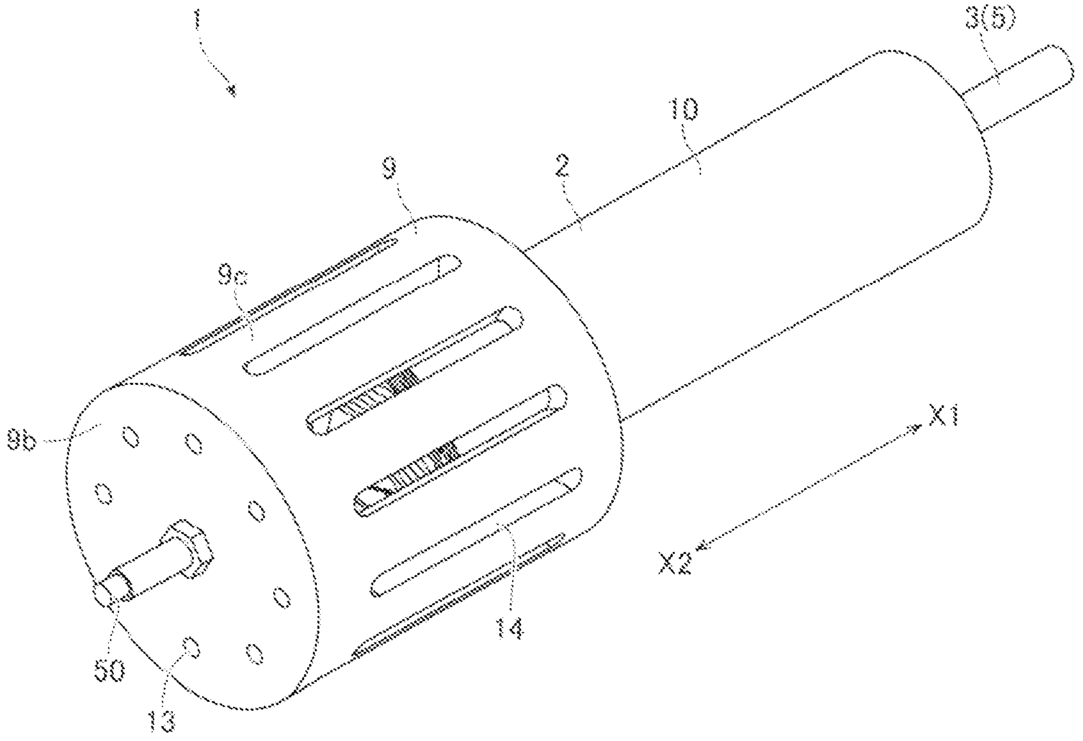
FIG. 2 is an exterior perspective view of the cylinder device according to the first embodiment as viewed from a rear side.
Figure 3:
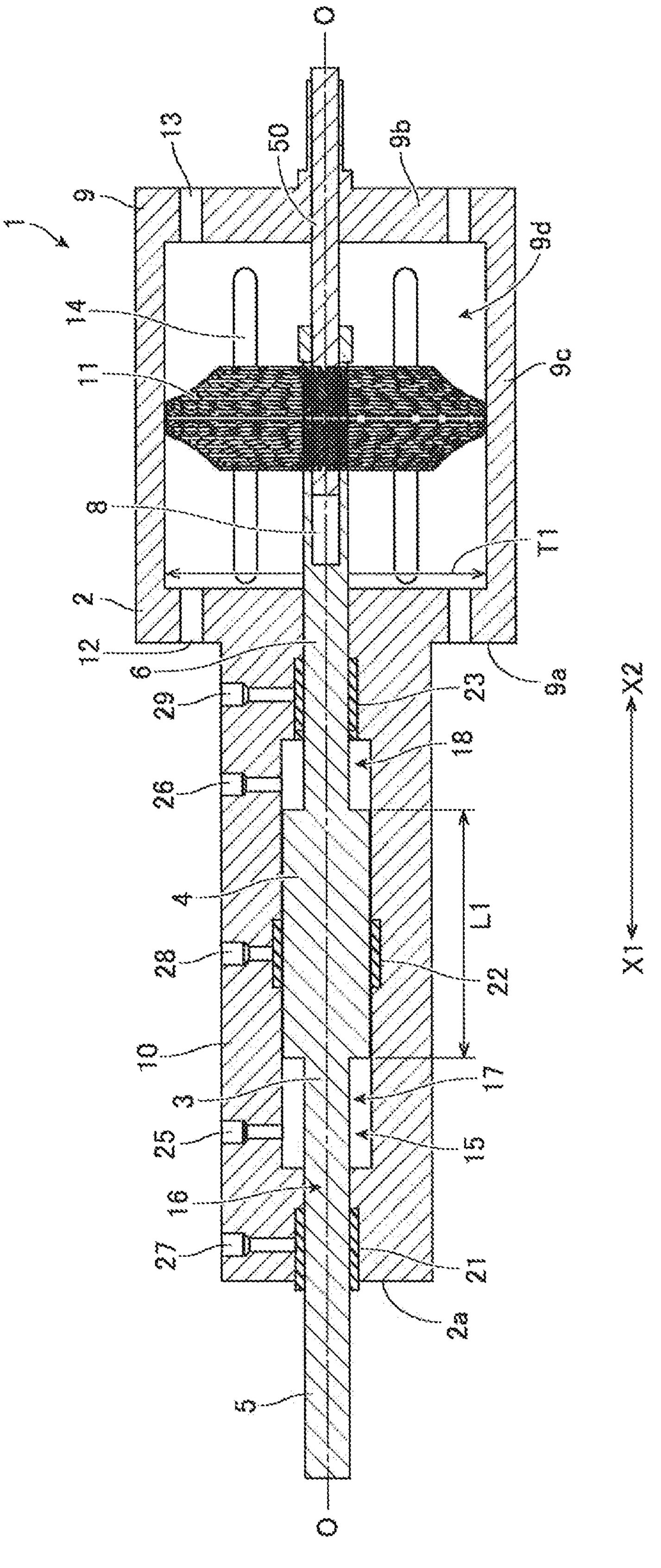
FIG. 3 is a cross-sectional view of the cylinder device according to the first embodiment.
Figure 4:
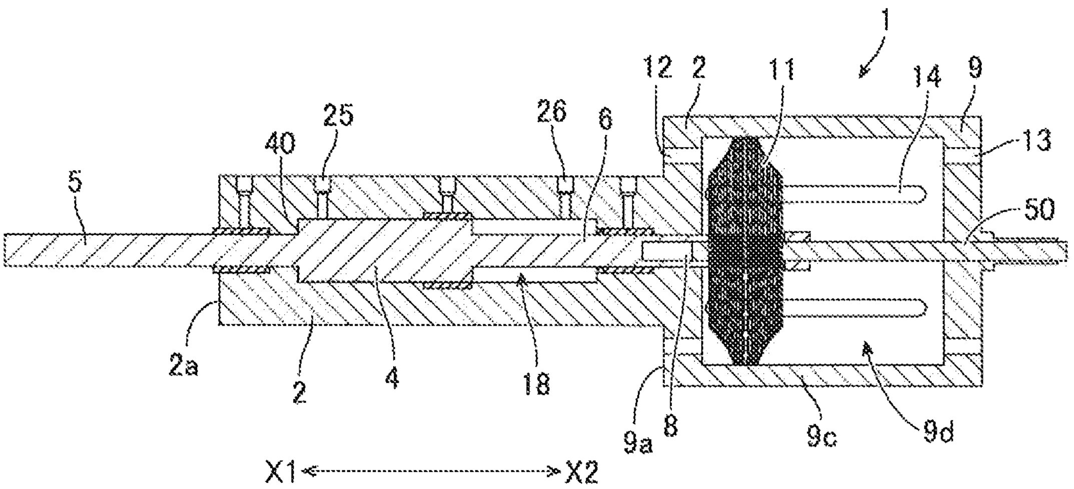
FIG. 4 is a cross-sectional view showing a state where a shaft member is stroked forward from the state of FIG. 3.
Figure 5:
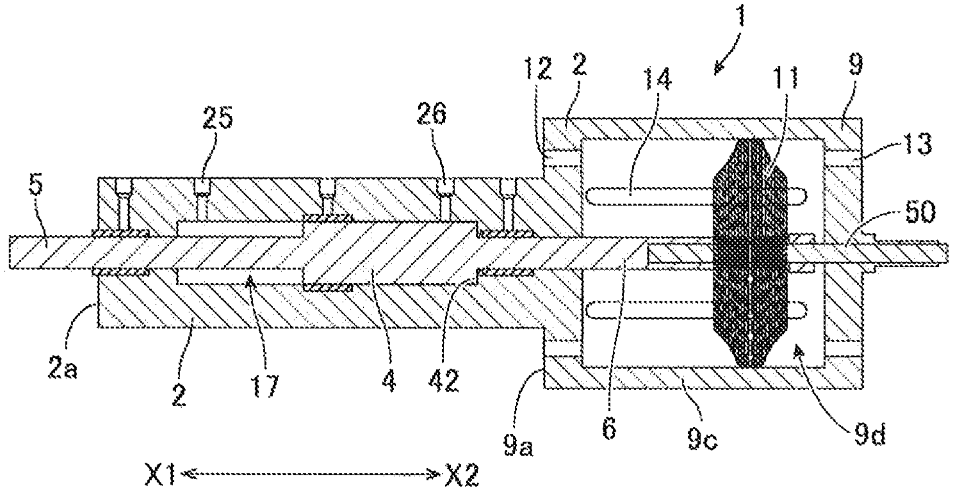
FIG. 5 is a cross-sectional view showing a state where the shaft member is stroked rearward from the state of FIG. 3.
Figure 6A:
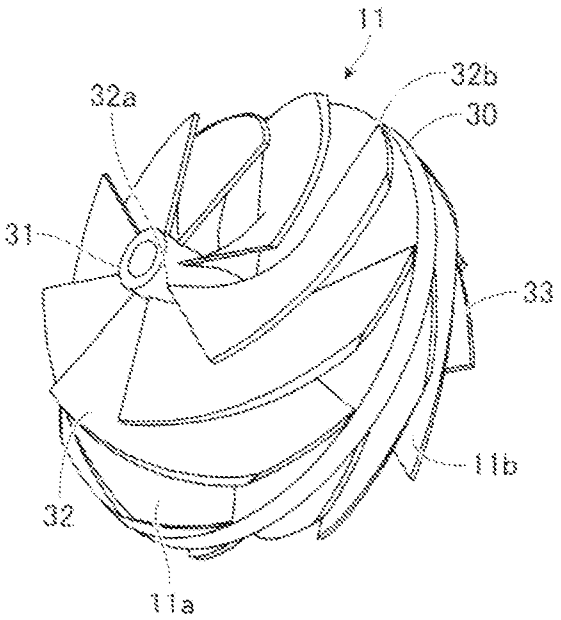
FIG. 6A is view of a rotating body used in the first embodiment.
Figure 6B:
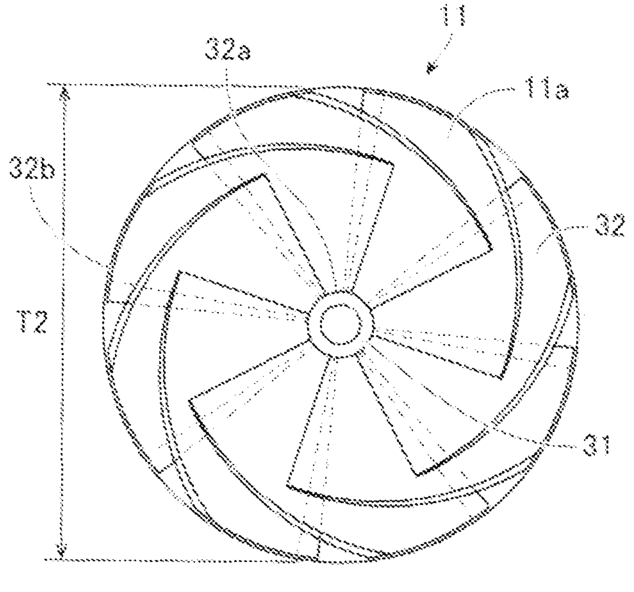
FIG. 6B is view of a rotating body used in the first embodiment.
Figure 6C:
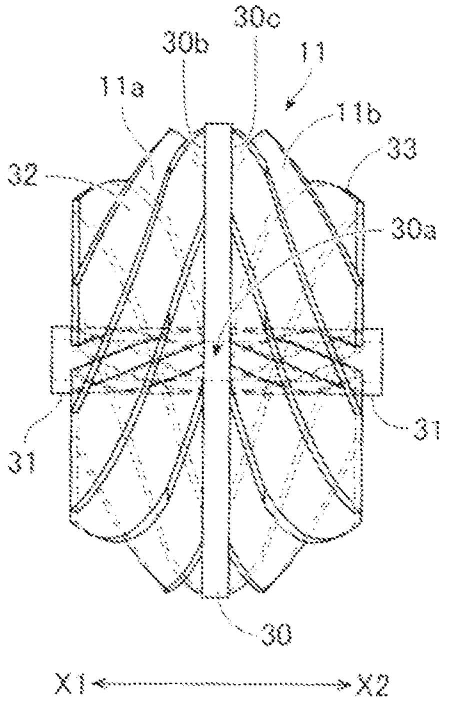
FIG. 6C is view of a rotating body used in the first embodiment.

FIG. 1 is an exterior perspective view of a cylinder device according to a first embodiment as viewed from a front side. FIG. 2 is an exterior perspective view of the cylinder device according to the first embodiment as viewed from a rear side. FIG. 3 is a cross-sectional view of the cylinder device according to the first embodiment. FIG. 4 is a cross-sectional view showing a state where a shaft member is stroked forward from the state of FIG. 3. FIG. 5 is a cross-sectional view showing a state where the shaft member is stroked rearward from the state of FIG. 3. FIGS. 6A to 6C are views of a rotating body used in the first embodiment.

A cylinder device 1 includes a cylinder body 2 and a shaft member 3 supported by the cylinder body 2.

In the first embodiment, the shaft member 3 is rotatably supported. On the other hand, a stroke of the shaft member 3 is arbitrary. In other words, the cylinder device 1 of the first embodiment may be configured to enable only rotation of the shaft member 3, or may be configured to enable both rotation and stroke of the shaft member 3. The same applies to a second embodiment to be described below. However, a description will be made below with respect to the cylinder device 1 in which the shaft member 3 is stroked in a shaft direction while rotating.

The term "rotation" means that the shaft member 3 rotates about a shaft center O which is the center of rotation (see FIG. 3). The term "stroke" means that the shaft member 3 moves in a shaft direction (X1-X2 direction). The X1 direction indicates a front side of the cylinder device 1, and the X2 direction indicates a rear side of the cylinder device 1.

As shown in FIG. 3, the shaft member 3 of the present embodiment includes a piston 4 formed with a predetermined diameter and having a predetermined length dimension L1 in the shaft direction (X1-X2 direction), a first piston rod 5 provided at a front end surface of the piston 4 and having a diameter smaller than that of the piston 4, and a second piston rod 6 provided at a rear end surface of the piston 4 and having a diameter smaller than that of the piston 4.

As shown in FIG. 3, the piston 4, the first piston rod 5, and the second piston rod 6 are preferably formed integrally with each other. As shown in FIG. 3, the piston 4, the first piston rod 5, and the second piston rod 6 have the shaft center O aligned on a straight line.

As shown in FIG. 3, a hole 8 is formed at a rear end of the second piston rod 6 along the shaft center O in a direction of the first piston rod 5.

Further, as shown in FIG. 3, a rotating body 11 is connected to an outer circumference of the rear end of the second piston rod 6.

As shown in FIGS. 1 to 3, the cylinder body 2 includes a rotation mechanism portion 9 and a stroke mechanism portion 10. The stroke mechanism portion 10 and the rotation mechanism portion 9 are divided from each other on the front side (in the X1 direction) and on the rear side (in the X2 direction) of the cylinder body 2, respectively.

As shown in FIGS. 1 to 3, the rotation mechanism portion 9 is formed with a diameter larger than that of the stroke mechanism portion 10. The rotation mechanism portion 9 includes a front end 9*a*, a rear end 9*b*, and an outer circumferential part 9*c* through which the front end 9*a* and the rear end 9*b* are linked to each other, and a rotation chamber (space) 9*d* is provided inside a region surrounded by the front end 9*a*, the rear end 9*b*, and the outer circumferential part 9*c*. The rotating body 11 connected to the shaft member 3 is disposed in the rotation chamber 9*d*. As shown in FIG. 3, a length of the rotation chamber 9*d* in a front-rear direction (X1-X2 direction) secures the maximum amount of movement of the rotating body 11 when the shaft member 3 strokes in the front-rear direction as shown in FIGS. 4 and 5.

In addition, as shown in FIG. 3, a diameter T1 of the rotation chamber 9*d* (a width in a direction orthogonal to the front-rear direction (X1-X2 direction)) of the rotation chamber 9*d* is slightly larger than a diameter T2 (see FIG. 6B) of the rotating body 11.

As shown in FIGS. 1 and 3, a plurality of first rotation ports 12 are formed at the annular front end 9*a* along a circumferential direction. Each of the first rotation ports 12 communicates with the inside of the rotation chamber 9*d*. The first rotation ports 12 are preferably formed at equal intervals.

As shown in FIGS. 2 and 3, a plurality of second rotation ports 13 are formed at the rear end 9*b* along a circumferential direction. Each of the second rotation ports 13 communicates with the inside of the rotation chamber 9*d*. The second rotation ports 12 are preferably formed at equal intervals.

Further, the first rotation ports 12 and the second rotation ports 13 are preferably formed to face each other in the front-rear direction (X1-X2 direction), but may be shifted from each other in the circumferential direction.

In FIGS. 1 to 3, the first rotation ports 12 and the second rotation ports 13 are formed in a circular shape, but are not limited in terms of the shape. The first rotation ports and the second rotation ports may be formed in a polygonal shape or a long-hole shape. Further, the first rotation ports 12 and the second rotation ports 13 are preferably formed in the same shape, but may be formed in different shapes.

As shown in FIGS. 1 to 3, a plurality of third rotation ports 14 having a long-hole shape, which is long in the front-rear direction (X1-X2 direction), are formed at the outer circumferential part 9*c* of the rotation mechanism portion 9 along the outer circumferential direction. The third rotation ports 14 are preferably formed at equal intervals. The third rotation ports 14 may have shapes other than the long-hole shape, and may have, for example, the circular shape similar to the first rotation ports 12 and the second rotation ports 13. However, since the third rotation ports 14 are used to discharge a fluid, a total area of the third rotation ports 14 is preferably larger than a total area of the first rotation ports 12 and the second rotation ports 13 because a fluid discharge can be promoted.

The first rotation ports 12 and the second rotation ports 13 are used to supply a fluid such as air or water. On the other hand, the third rotation ports 14 are used to discharge the fluid. In the present embodiment, the fluid is supplied from the front and rear of the rotation chamber 9*d* through the first rotation ports 12 and the second rotation ports 13. For example, the fluid is compressed air, and the rotating body 11 receives the compressed air from both the front and rear sides and rotates. The compressed air, which hits the rotating body 11, diffuses sidewards, and is discharged from the third rotation ports 14 to the outside. As the rotating body 11 rotates, the shaft member 3 connected to the rotating body 11 can rotate about the shaft center O which is the center of rotation.

As shown in FIG. 3, a cylinder chamber 15 is provided inside the stroke mechanism portion 10. Further, an insertion portion 16 is provided which penetrates from the cylinder chamber 15 to a front end surface 2*a* of the cylinder body 2 and is continuous with the cylinder chamber 15.

As shown in FIG. 3, the piston 4 of the shaft member 3 is housed in the cylinder chamber 15. Further, the first piston rod 5 of the shaft member 3 is inserted into the insertion portion 16.

The cylinder chamber 15 is a substantially cylindrical space having a diameter slightly larger than the diameter of the piston 4. Further, the cylinder chamber 15 is formed to have a length dimension in the front-rear direction (X1-X2 direction) longer than the length dimension L1 of the piston 4. Therefore, the piston 4 is movably housed in the cylinder chamber 15 in the shaft direction (X1-X2 direction).

In the state of FIG. 3, the piston 4 is housed near a center of the cylinder chamber 15 in the front-rear direction (X1-X2 direction). For this reason, spaces are provided on the front side (X1 side) and on the rear side (X2 side) of the piston 4, respectively. Here, the space on the front side is referred to as a first fluid chamber 17, and the space on the rear side is referred to as a second fluid chamber 18. The first fluid chamber 17 and the second fluid chamber 18 are divided from each other and do not interfere with each other.

As shown in FIG. 3, the stroke mechanism portion 10 is formed with stroke ports 25 and 26 communicating with the first fluid chamber 17 and the second fluid chamber 18.

The cylinder device 1 of the present embodiment is, for example, an air bearing-type cylinder device, and is provided with a plurality of air bearings 21, 22, and 23. As shown in FIG. 3, the air bearing 21 is disposed to surround an outer circumference of the first piston rod 5. Further, the air bearing 22 is disposed to surround an outer circumference of the piston 4. Further, the air bearing 23 is disposed to surround an outer circumference of the second piston rod 6.

Although not being limited, an example of each of the air bearings 21 to 23 can include an air bearing in which a porous material using sintered metal or carbon is formed in a ring shape or an orifice throttle-type air bearing.

As shown in FIG. 3, the stroke mechanism portion 10 is provided with air bearing pressurizing ports 27, 28, and 29 that communicate with the air bearings 21, 22, and 23, respectively, from an outer circumferential surface.

The compressed air is supplied to each of the air bearing pressurizing ports 27 to 29, and thus the compressed air uniformly blows onto surfaces of the piston 4, the first piston rod 5, and the second piston rod 6 through the each of the air bearings 21 to 23. Thereby, each of the piston 4, the first piston rod 5, and the second piston rod 6 is supported in a state of floating in the cylinder chamber 15 and the insertion portion 16.

In the cylinder device 1 of the present embodiment, as described above, the fluid is supplied from the front and rear of the rotating body 11 and is discharged from the side, and thus the rotating body 11 and the shaft member 3 can rotate about the shaft center O which is the center of rotation. A rotational angle is not finite, and a rotational frequency or a rotational speed can be adjusted by the amount of fluid.

In the present embodiment, since the cylinder device has the air bearing-type configuration, the piston 4 of the shaft member 3 is supported in the state of floating in the cylinder chamber 15 of the cylinder body 2. In the present embodiment, accordingly, the shaft member 3 can rotate in the state of floating in the cylinder body 2. Since the shaft member 3 and the cylinder body 2 are not in contact with each other, a rotational resistance can be reduced and the rotation can be made with high accuracy. Further, a differential pressure between the first fluid chamber 17 and the second fluid chamber 18 is generated using a supply and discharge of the compressed air from the stroke ports 25 and 26 communicating with the cylinder chamber 15 in the state where the shaft member 3 floats in the cylinder body 2. Thereby, the piston 4 can be stroked in the shaft direction (X1-X2 direction). Although not shown, a cylinder control pressure can be appropriately adjusted by servo valves that communicate with the stroke ports 25 and 26, respectively.

From the state of FIG. 3, the compressed air in the first fluid chamber 17 is sucked through the stroke port 25 by the servo valve. On the other hand, the compressed air is supplied into the second fluid chamber 18 through the stroke port 26 by the servo valve. Thus, the differential pressure is generated between the first fluid chamber 17 and the second fluid chamber 18, and the piston 4 can move to the front side (X1) as shown in FIG. 4. Thus, the first piston rod 5 can be protruded forward from the front end surface 2*a* of the cylinder body 2.

A front wall 40 is provided between the cylinder chamber 15 and the insertion portion 16, and the piston 4 is regulated so as not to move forward from the front wall 40. Further, although not shown, the front wall 40 is preferably provided with an elastic ring. The elastic ring acts as a buffer material when the piston 4 comes into contact with the front wall 40.

Alternatively, from the state of FIG. 3, the compressed air in the second fluid chamber 18 is sucked through the stroke port 26 by the servo valve. On the other hand, the compressed air is supplied into the first fluid chamber 17 through the stroke port 25 by the servo valve. Thus, the differential pressure is generated between the first fluid chamber 17 and the second fluid chamber 18, and the piston 4 can move to the rear side (X2) as shown in FIG. 5. Thus, the first piston rod 5 can be retracted rearward from the front end surface 2*a* of the cylinder body 2.

A rear wall 42 of the cylinder chamber 15 is a regulatory surface that regulates the movement of the piston 4 to the rear side (X2), and the piston 4 can hardly move rearward from the rear wall 42. Further, although not shown, the rear wall 42 is preferably provided with an elastic ring. The elastic ring acts as a buffer material when the piston 4 comes into contact with the rear wall 42.

The rotating body 11 of the first embodiment will be described. As shown in FIGS. 6A to 6C, the rotating body 11 of the first embodiment includes a first rotating body 11*a* that receives the fluid from the first rotation port 12 and a second rotating body 11*b* that receives the fluid from the second rotation port 13. As shown in FIG. 6C, a support body 30 is provided between the first rotating body 11*a* and the second rotating body 11*b*. A through hole 30*a* is formed in a central part of the support body 30. Tubular portions 31 communicating with each other are provided on front and rear of the through hole 30*a*. The support body 30 and the tubular portion 31 are preferably formed integrally with each other.

As shown in FIGS. 6A to 6C, the first rotating body 11*a* includes a plurality of vanes 32 disposed on a front surface 30*b* of the support body 30. Each of the vanes 32 is a plate having substantially the same shape. The vane 32 includes a first connection portion 32*a* connected to the outer circumferential surface of the tubular portion 31 provided on the front surface 30*b* of the support body 30 and a second connection portion 32*b* connected to a circumferential edge of the front surface 30*b* of the support body 30. The first connection portion 32*a* of the vane 32 is in contact with the outer circumferential surface of the tubular portion 31 apart forward from the front surface 30*b* of the support body 30, and the vane 32 is supported in a state of gradually inclined from the first connection portion 32*a* toward the second connection portion 32*b* (see also FIG. 6C). Further, as shown in FIGS. 6A and 6B, the vanes 32 adjacent to each other are disposed so as to partially overlap each other as viewed from the front.

The second rotating body 11*b* includes a plurality of vanes 33 disposed on a back surface 30*c* of the support body 30. Although not shown, similarly to the vanes 32 forming the first rotating body 11*a*, each of the vanes 33 is inclined diagonally from the outer circumferential surface of the tubular portion 31 toward the back surface 30*c* of the support body 30, and the vanes 33 adjacent to each other are disposed so as to partially overlap each other.

In the rotating body 11 shown in FIGS. 6A to 6C, the plurality of vanes 32 forming the first rotating body 11*a* and the plurality of vanes 33 forming the second rotating body 11*b* are disposed to be in plane symmetry to each other with the support body 30 as a symmetrical plane.

The second piston rod 6 is passed through the tubular portion 31, and the rotating body 11 is fixedly supported on the outer circumferential surface of the second piston rod 6.

The fluid supplied from the first rotation port 12 into the rotation chamber 9*d* hits the vane 32 of the first rotating body 11*a*. Further, the fluid supplied from the second rotation port 13 into the rotation chamber 9*d* hits the vane 33 of the second rotating body 11*b*. At this time, since the vane 32 of the first rotating body 11*a* and the vane 33 of the second rotating body 11*b* are disposed to be in plane symmetry, rotational forces thereof are generated in the same direction, and thus the rotating body 11 can rotate with high accuracy. At this time, if each of the first rotation ports 12 and each of the second rotation ports 13 are formed at positions facing each other in the front-rear direction (X1-X2 direction), when the fluid acts on each of the first rotating body 11*a* and the second rotating body 11*b* through each of the rotation ports 12 and 13, it is possible to efficiently generate the rotational force while canceling the force applied to the first rotating body 11*a* and the second rotating body 11*b* in the shaft direction and it becomes difficult to apply an unnecessary force in the shaft direction.

Further, the diameter T1 (the width in the direction orthogonal to the front-rear direction) of the rotation chamber 9*d* shown in FIG. 3 is substantially equal to the diameter T2 (see FIG. 6B) of the rotating body 11. Thereby, the fluid supplied from each of the rotation ports 12 and 13 into the rotation chamber 9*d* can flow to the opposite side through the rotating body 11 as small as possible. Therefore, it is possible to prevent the fluids supplied from the rotation ports 12 and 13 from being mixed in the rotation chamber 9*d* and to allow rotation with high accuracy. Since the diameter T2 of the rotating body 11 is set to be slightly smaller than the diameter T1 of the rotation chamber 9*d*, the rotating body 11 can rotate without coming into contact with the wall surface of the rotation chamber 9*d*.

In the present embodiment, the fluids, which hit the first rotating body 11*a* and the second rotating body 11*b*, are diffused sidewards and are discharged to the outside from the third rotation port 14. Due to a centrifugal force caused by the rotating body 11 and an inclination of each of the vanes 32 and 33 forming the first rotating body 11*a* and the second rotating body 11*b*, the fluids can be appropriately diffused sidewards.

In the present embodiment, as described above, for example, using the structure of the rotating body 11 shown in FIGS. 6A to 6B, it is possible to supply the fluid to the rotating body 11 in the front-rear direction (X1-X2 direction), to flow the fluid to escape to the outside from the side (the direction orthogonal to the front-rear direction), and to accurately rotate the shaft member 3, to which the rotating body 11 is connected, about the shaft center O which is the center of rotation.

As shown in FIGS. 3 to 5, a sensor (stroke sensor) 50 is provided in the hole 8 formed at the rear end of the second piston rod 6 in a non-contact manner with the second piston rod 6. The sensor 50 is fixedly supported on the rear end side of the cylinder body 2.

In the present embodiment, a position of the piston 4 can be measured by the sensor 50 disposed in the hole 8. An example of the sensor 50 can include an existing sensor such as a magnetic sensor, an eddy-current sensor, or an optical sensor.

Position information measured by the sensor 50 is transmitted to a control unit (not shown). Based on the position information measured by the sensor 50, the cylinder control pressures of the first fluid chamber 17 and the second fluid chamber 18 can be adjusted to control the amount of protrusion of the first piston rod 5 from the front end surface 2*a*.

Further, the sensor 50 can also measure a rotational frequency or a rotational speed of the shaft member 3. Based on rotation information measured by the sensor 50, a rotation pressure can be adjusted to control a rotational frequency or a rotational speed of the rotating body 11.

Figure 7:
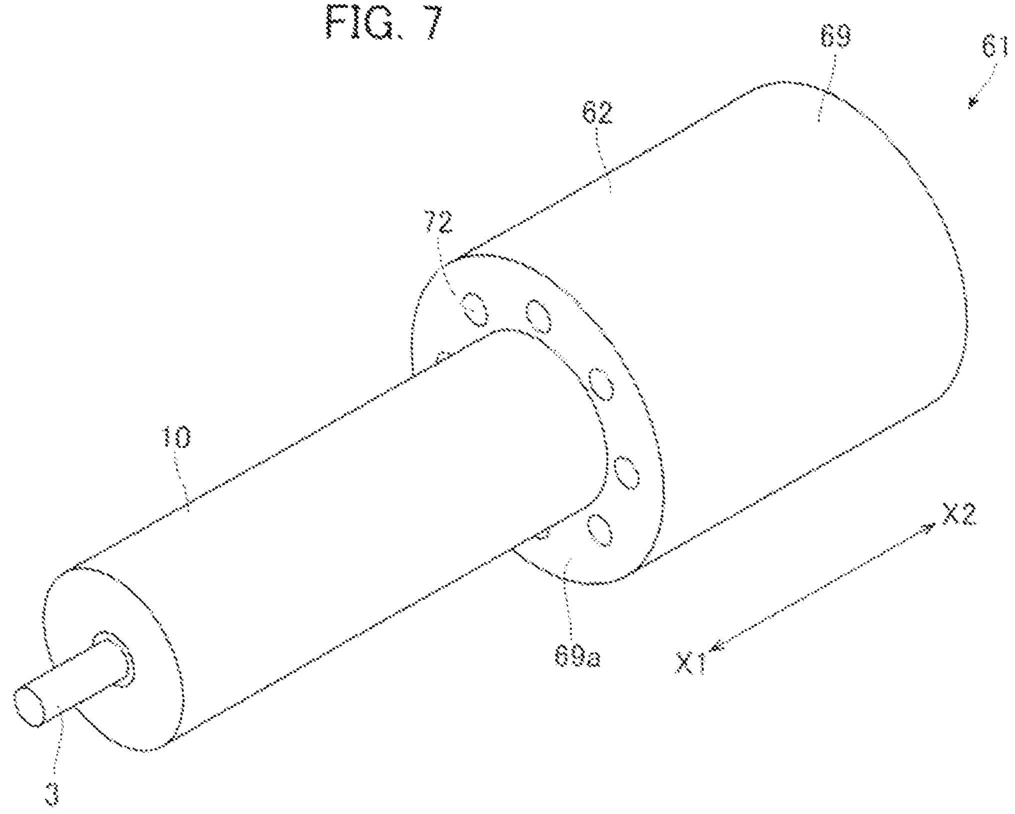
FIG. 7 is an exterior perspective view of a cylinder device according to a second embodiment as viewed from a front side.
Figure 8:
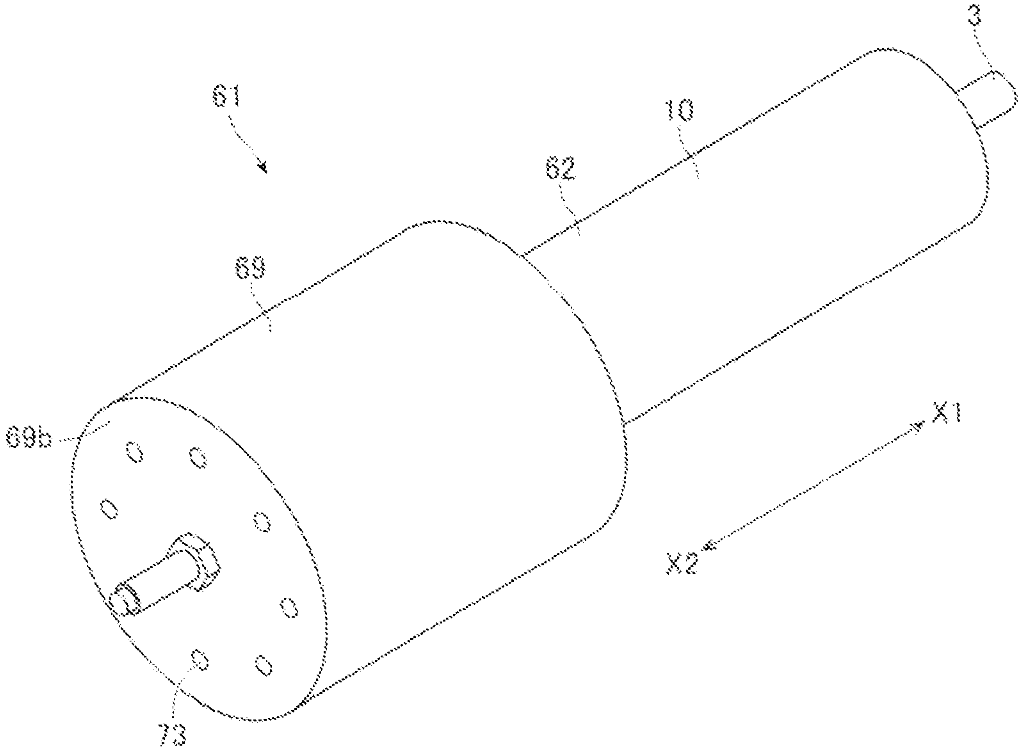
FIG. 8 is an exterior perspective view of the cylinder device according to the second embodiment as viewed from a rear side.
Figure 9:
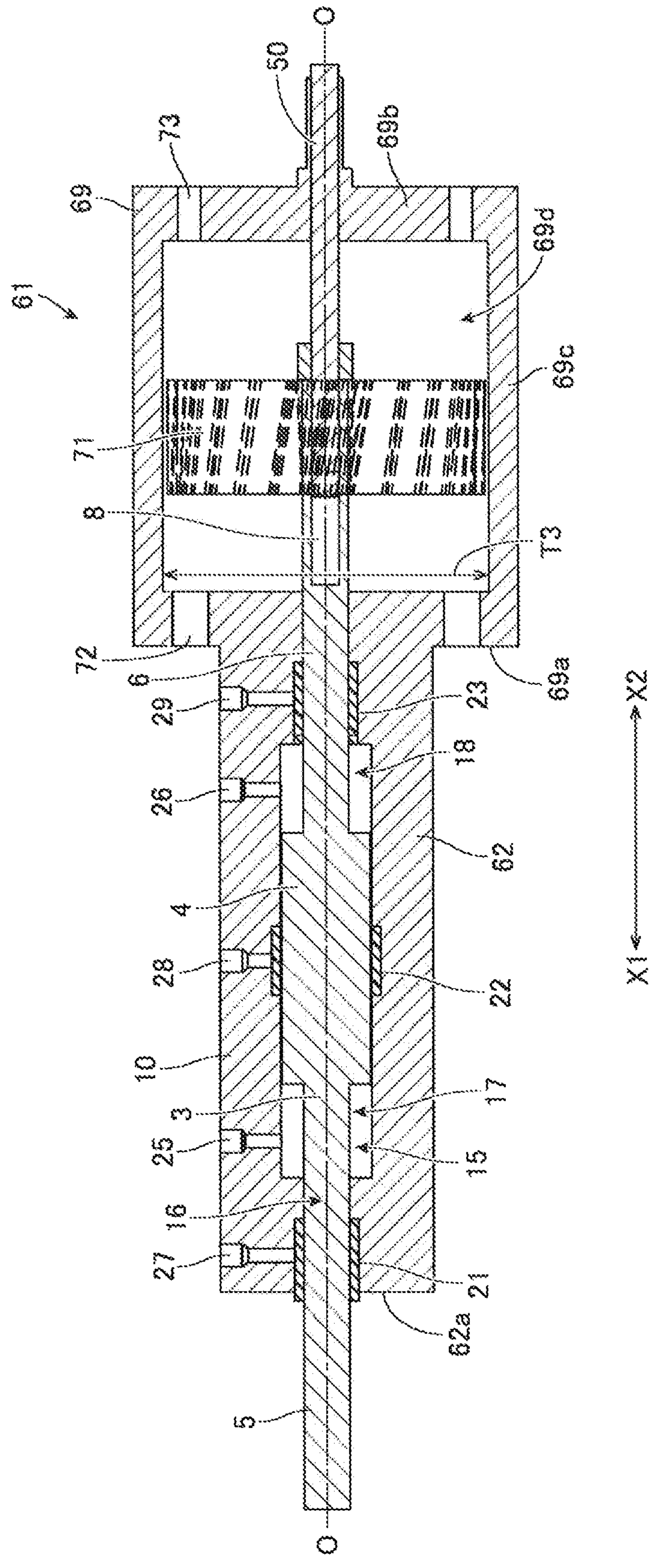
FIG. 9 is a cross-sectional view of the cylinder device according to the second embodiment.
Figure 10:
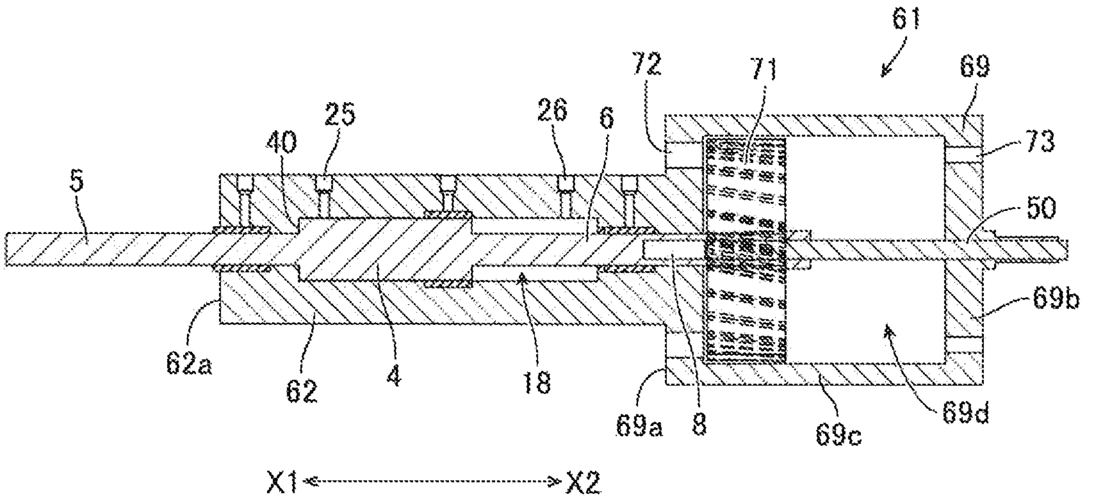
FIG. 10 is a cross-sectional view showing a state where a shaft member is stroked forward from the state of FIG. 9.
Figure 11:
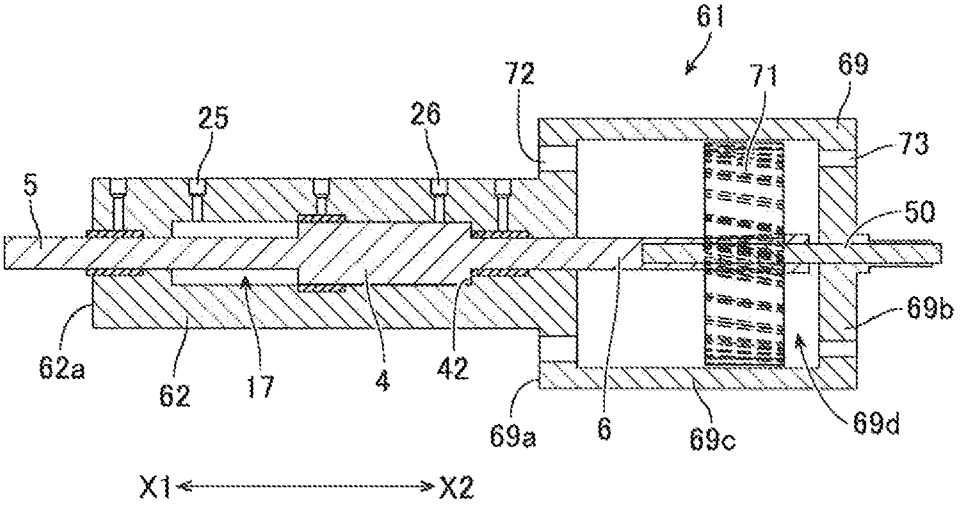
FIG. 11 is a cross-sectional view showing a state where the shaft member is stroked rearward from the state of FIG. 9.
Figure 12A:
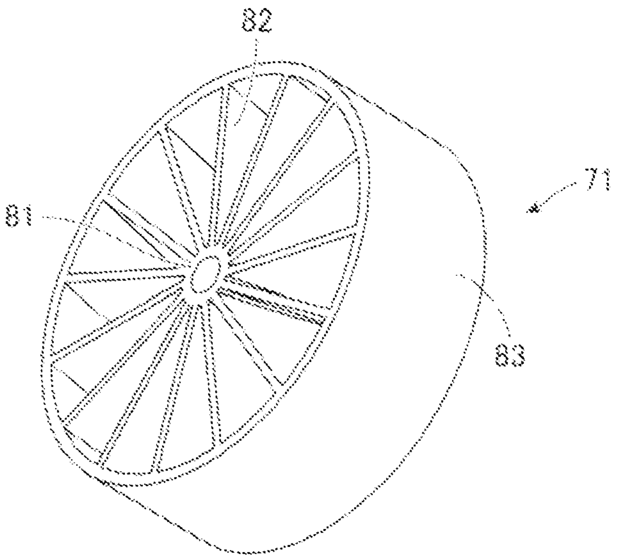
FIG. 12A is view of a rotating body used in the second embodiment.
Figure 12B:
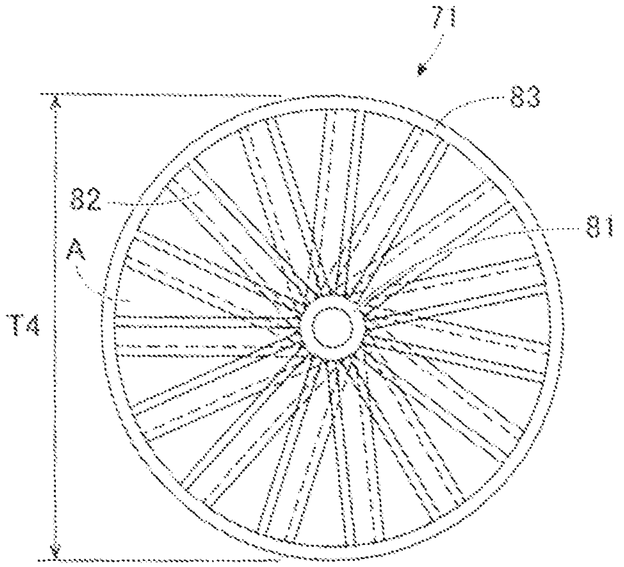
FIG. 12B is view of a rotating body used in the second embodiment.
Figure 12C:
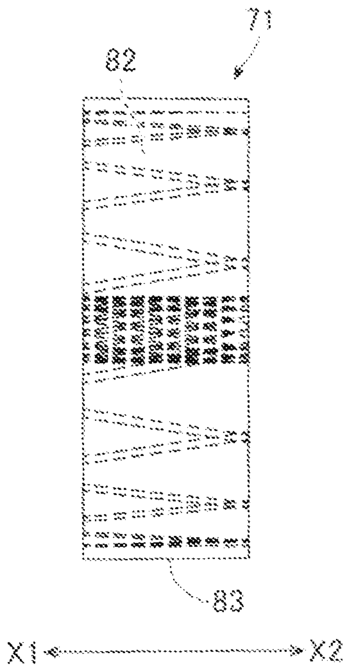
FIG. 12C is view of a rotating body used in the second embodiment.

FIG. 7 is an exterior perspective view of a cylinder device according to a second embodiment as viewed from a front side. FIG. 8 is an exterior perspective view of the cylinder device according to the second embodiment as viewed from a rear side. FIG. 9 is a cross-sectional view of the cylinder device according to the second embodiment. FIG. 10 is a cross-sectional view showing a state where a shaft member is stroked forward from the state of FIG. 9. FIG. 11 is a cross-sectional view showing a state where the shaft member is stroked rearward from the state of FIG. 9. FIGS. 12A to 12C are views of a rotating body used in the second embodiment.

Hereinafter, differences from the cylinder device 1 of the first embodiment will be mainly described. The members having the same structure as the cylinder device 1 of the first embodiment are denoted by the same reference numerals. As shown in FIGS. 7 and 8, a cylinder device 61 includes a cylinder body 62 and a shaft member 3 supported in the cylinder body 62.

The cylinder body 62 is divided into a rotation mechanism portion 69 and a stroke mechanism portion 10. As shown in FIG. 9 and the like, the rotation mechanism portion 69 includes a front end 69*a*, a rear end 69*b*, and an outer circumferential part 69*c* through which the front end 69*a* and the rear end 69*b* are linked to each other, and a rotation chamber (space) 69*d* is provided inside a region surrounded by the front end 69*a*, the rear end 69*b*, and the outer circumferential part 69*c*.

As shown in FIGS. 7 to 9, the rotation mechanism portion 69 of the second embodiment is configured in which the front end 69*a* and the rear end 69*b* are provided with a first rotation port 72 and a second rotation port 73, respectively, like the rotation mechanism portion 9 of the first embodiment, but the outer circumferential part 69*c* is not provided with a rotation port unlike the first embodiment.

In the second embodiment, any one of the first rotation port 72 and the second rotation port is used for a fluid supply, and the other is used for a fluid discharge.

A rotating body 71 connected to a rear end of a second piston rod 6 of the shaft member 3 includes, for example, a ring portion 83, a cylindrical portion 81 located at a center of the ring portion 83, and a plurality of vanes 82 through which the cylindrical portion 81 and the ring portion 83 are radially connected to each other, as shown in FIGS. 12A to 12B. The respective vanes 82 are disposed at equal angles, and penetrating spaces A are formed between the respective vanes 82. As shown in FIG. 12B and the like, each of the vanes 82 is supported in a state of being obliquely inclined from a front end side toward a rear end side. The ring portion 83 may not be provided, but is preferably disposed for reinforcement.

The second piston rod 6 passes through the cylindrical portion 81, and the rotating body 71 is fixedly supported on a rear end side of the second piston rod 6.

In the present embodiment, a diameter T3 (a width in a direction orthogonal to a front-rear direction) of a rotation chamber 69*d* shown in FIG. 9 is substantially equal to a diameter T4 (see FIG. 12B) of the rotating body 71, but it is preferable that the diameter T3 is slightly larger than the diameter T4.

In the second embodiment, for example, compressed air is set into the rotation chamber 69*d* through the second rotation port 73. The compressed air hits the vanes 82, and the rotating body 71 rotates. The compressed air is discharged to the outside from the first rotation port 72 through the spaces A formed between the vanes 82.

As described above, since the diameter T3 of the rotation chamber 69*d* is substantially equal to the diameter T4 of the rotating body 71, most of the fluid supplied into the rotation chamber 69*d* can be applied to the rotation of the rotating body 71, and rotation efficiency on the supply amount of the fluid can be increased. Since the diameter T4 of the rotating body 71 is set to be slightly smaller than the diameter T3 of the rotation chamber 69*d*, the rotating body 71 can rotate in a floating state without sliding on a wall surface of the rotation chamber 69*d*.

Similarly to the cylinder device 1 of the first embodiment, since the cylinder device 61 of the second embodiment has also an air bearing-type configuration, the shaft member 3 can be supported in a state of floating inside the cylinder body 2. Then, a differential pressure is generated in the cylinder chamber 15 using a supply and discharge of the compressed air from stroke ports 25 and 26 communicating with the cylinder chamber 15 in the state where the shaft member 3 floats in the cylinder body 62, thereby the piston 4 can be stroked in the shaft direction (X1-X2 direction). Thus, the first piston rod 5 is protruded from the front end surface 62*a* toward a front (in an X1 direction) as shown in FIG. 10 from the state of FIG. 9, and the first piston rod 5 can be retracted toward a rear (in an X2 direction) as shown in FIG. 11 from the state of FIG. 9, with small sliding resistance as far as possible. In the present embodiment, the shaft member 3 can be stroked in the front-rear direction (X1-X2 direction) while rotating, and can be stroked and rotate with high accuracy.

Features of the Present Embodiments Will be Described

The present embodiments relate to the cylinder device 1 or 61 including the cylinder body 2 or 62 and the shaft member 3 supported in the cylinder body 2 or 62, and the cylinder body 2 or 62 is provided with the rotation mechanism portion 9 or 69 including the rotation chamber 9*d* or 69*d* and configured to rotate the shaft member 3 based on the action of the fluid. Then, at least the rotation ports 12 and 13 or 72 and 73 communicating with the rotation chamber 9*d* or 69*d* are provided with at the front end 9*a* or 69*a* and the rear end 9*b* or 69*b* of the rotation mechanism portion 9 or 69.

In the present embodiments, as described above, the rotation ports 12 and 13 or 72 and 73 communicating with the rotation chamber 9*d* or 69*d* are disposed in the front-rear direction (X1-X2 direction) which is the shaft direction of the shaft member 3. In the present embodiment, the shaft member 3 can rotate due to the action of the fluid supplied into the rotation chamber 9*d* or 69*d*. According to such a configuration, it is possible to reduce power consumption and achieve compactification as compared with the conventional configuration using a rotary motor such as a stepping motor or a servo motor.

In the configuration in which the shaft member 3 rotates due to the action of the fluid as in the present embodiments, rotation unevenness can be prevented. In particular, according to the present embodiments, the fluid can act along the shaft direction, eccentricity hardly occurs in the shaft member 3 during the rotation, and rotation unevenness can be effectively prevented.

In the cylinder device 1 of the first embodiment, the first rotation port 12 and the second rotation port 13, which are provided at the front end 9*a* and the rear end 9*b* of the rotation mechanism portion 9, respectively, are used for a fluid supply. The third rotation port 14 communicating with the rotation chamber 9*d* is provided on the outer circumferential part 9*c* of the rotation mechanism portion 9 and is used for the fluid discharge. Thus, the rotation mechanism can be configured in which the fluid is supplied into the rotation chamber 9*d* in the front-rear direction (X1-X2 direction) and is discharged from the side, so that the fluid can be appropriately supplied and discharged. Thereby, rotation unevenness can be effectively prevented. Further, due to such a fluid flow, it is possible to appropriately prevent the generation of thrust in the shaft direction (X1-X2 direction) for the shaft member 3.

The rotating body 11 of the first embodiment is embodied by the structure shown in FIGS. 6A to 6C, for example. In other words, the rotating body 11 includes the first rotating body 11*a* that receives the fluid supplied from the front end 9*a* to the rotation chamber 9*d* of the rotation mechanism portion 9 and the second rotating body 11*b* that receives the fluid from the rear end 9*b* to the rotation chamber 9*d* of the rotation mechanism portion 9. Each of the first rotating body 11*a* and the second rotating body 11*b* has the vane structure capable of discharging the fluid to the outside from the third rotation port 14 provided on the outer circumferential part 9*c* of the rotation mechanism portion 9.

As described above, since the rotating body 11 has the structure in which the fluid is received from both the front and rear, even when the position of the rotating body 11 changes in the rotation chamber 9*d*, the generation of thrust in the shaft direction (X1-X2 direction) can be prevented. The amount of fluid to be supplied from the first rotation port 12 and the second rotation port 13 can be adjusted depending on the position of the rotating body 11, and the generation of thrust can be effectively prevented.

In the cylinder device 61 of the second embodiment, one rotation port provided at the front end 69*a* and the rear end 69*b* of the rotation mechanism portion 69 is used to supply the fluid, and the other rotation port is used to discharge the fluid. Thereby, the fluid can be appropriately supplied and discharged along the shaft direction (X1-X2 direction), and rotation unevenness can be effectively prevented.

The rotating body 71 of the second embodiment is embodied by the structure shown in FIGS. 12A to 12C, for example. In other words, the rotating body 71 has the vane structure capable of receiving the fluid supplied from one rotation port and allowing the fluid to pass toward the other rotation port. With such a rotating body 71, the fluid does not stay in the rotation chamber 69*d*, and rotation unevenness can be effectively prevented. Further, in the second embodiment, it is possible to generate a thrust in the shaft direction (X1-X2 direction) for the shaft member 3. In other words, when the first piston rod 5 of the shaft member 3 protrudes forward in the structure in which the stroke is performed while rotating, the fluid is supplied from the second rotation port 73 and the fluid is discharged from the first rotation port 72, so that a thrust can be generated the front side (X1) for the shaft member 3. Further, when the first piston rod 5 of the shaft member 3 is retracted rearward, the fluid is supplied from the first rotation port 72 and the fluid is discharged from the second rotation port 73, so that a thrust can be generated toward the rear side (X2) for the shaft member 3. As described above, in the second embodiment, the thrust can be generated in the front-rear direction with the rotation to assist the movement of the shaft member 3 in the front-rear direction.

In both of the first and second embodiments, the shaft member 3 is preferably supported to be capable of stroke. Thereby, the shaft member 3 can be stroked while rotating.

In the cylinder body 2 or 62, the stroke mechanism portion 10 including the cylinder chamber 15 is divided from the rotation mechanism portion 9 or 69, and the stroke mechanism portion 10 is preferably provided with the stroke ports 25 and 26 communicating with the cylinder chamber 15. Thereby, it is possible to manufacture the cylinder device 1 or 61 in which the fluid supplied to the cylinder chamber 15 of the stroke mechanism portion 10 and the fluid supplied to the rotation chamber 9*d* or 69*d* of the rotation mechanism portion 9 or 69 can be prevented from interfering with each other and the shaft member 3 can be stroked while rotating with a simple structure. The fluid acting on the stroke mechanism portion 10 and the fluid acting of the rotation mechanism portion 9 or 69 may be the same as or different from each other. For example, the compressed air can act on both the stroke mechanism portion 10 and the rotation mechanism portion 9 or 69.

In the present embodiments, the shaft member 3 preferably includes a fluid bearing, and the shaft member 3 is preferably supported in the state of floating in the cylinder body. Thereby, sliding resistance during the stroke and rotation can be reduced, and the stroke and rotation can be performed with high accuracy. The air bearing is preferably used as the fluid bearing.

The present invention is not limited to the above embodiments, and can be modified in various ways. In the above embodiments, the size and shape shown in the accompanying drawings can be appropriately changed within the range, in which the effects of the present invention are exhibited, without limitation. In addition, the above embodiments can be appropriately modified and implemented without deviating from the scope of the object of the present invention.

For example, the sensor 50 is not disposed as shown in FIGS. 3 and 9, and the like, and the sensor 50 may be disposed such that the position of the first piston rod 5 can be directly measured.

However, when the sensor 50 is disposed in the hole 8 formed at the rear end of the second piston rod 6, the sensor 50 can be disposed, without any difficulty, on the second piston rod 6 in a non-contact manner, compactification can be promoted, and the accuracy of position and rotation measurement can be improved.

The cylinder body 2 or 62 may be formed in such a manner that a plurality of divided cylinder bodies are assembled or integrated.

The cylinder body 2 or 62 and the shaft member 3 are made of, for example, an aluminum alloy, but the material can be variously changed depending on the intended use, installation locations and the like without limitation.

As described above, according to the present embodiments, since the cylinder device 1 or 61 can be driven by the action of a fluid other than air, for example, a hydraulic cylinder can be exemplified in addition to the air bearing-type cylinder, as the cylinder device.

According to the present invention, it is possible to realize a cylinder device capable of preventing rotation unevenness while reducing power consumption and promoting compactification. The present invention may be either of a cylinder device capable of only rotation or a cylinder device capable of both rotation and stroke. According to the present invention, it is possible to obtain excellent rotation accuracy and rotational stroke accuracy. In this way, when the cylinder device of the present invention is applied to a use that requires high rotational accuracy and rotational stroke accuracy or the like, it is possible to reduce power consumption and promote compactification in addition to high accuracy.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A cylinder device comprising:

a cylinder body having a front side and a rear side; and a shaft member supported in the cylinder body for rotation about the shaft center line that extends between the front side and the rear side of the cylinder body, wherein the cylinder body is provided with a rotation mechanism including a rotation chamber through which the shaft member extends and a rotating body mounted on the shaft member in the chamber, the rotating body connected to an end portion of the shaft member to rotate the shaft member in accordance with an action of compressed air, wherein the rotation mechanism has a front end positioned at the front side of the cylinder body, a rear end positioned at the rear side of the cylinder body, and an outer circumferential part by which the front end and the rear end are connected, wherein the rotation chamber is defined by an internal region defined by the front end, the rear end and the outer circumferential part, wherein the rotation mechanism is provided with supply rotation ports in the front end and in the rear end, respectively, that communicably connect with the rotation chamber, the compressed air being supplied to the rotating body by each supply rotation port, wherein the outer circumferential part is provided with a plurality of discharge rotation ports, that communicably connect with the rotation chamber for discharging the compressed air, wherein the plurality of the discharge rotation ports are respectively formed, on the outer circumferential part between the front end and the rear end, as long-holes extending in a direction parallel to the shaft center line, and the discharge rotation ports are located at intervals in a circumferential direction about the shaft center, and wherein the shaft member is supported to be capable of stroke movement, wherein the rotating body strokes with the shaft member, and wherein the discharge rotation ports are provided within a stroke movement range of the rotating body along a direction parallel to the shaft center line.

2. The cylinder device according to claim 1, the rotating body comprises:

a first rotating body that is capable of receiving the compressed air supplied from the front end of the rotation mechanism to the rotation chamber and is capable of sending the compressed air to the discharge rotation port; and a second rotating body that is capable of receiving the compressed air supplied from the rear end of the rotation mechanism to the rotation chamber and is capable of sending the compressed air to the discharge rotation port.

3. The cylinder device according to claim 1, wherein the cylinder body includes a fluid bearing, and the shaft member is supported in a state of floating in the cylinder body by the fluid bearing.

4. A cylinder device comprising:

a cylinder body having a front side and a rear side; and a shaft member supported in the cylinder body for rotation about the shaft center line that extends between the front side and the rear side of the cylinder body, wherein the cylinder body is provided with a rotation mechanism including a rotation chamber through which the shaft member extends along the shaft center line and a rotating body mounted on the shaft member in the chamber, the rotating body connected to an end portion of the shaft member to rotate the shaft member about the shaft center line in accordance with an action of compressed air, wherein the rotation mechanism has a front end positioned at the front side of the cylinder body, a rear end positioned at the rear side of the cylinder body, and an outer circumferential part by which the front end and the rear end are connected, wherein the rotation chamber is defined by an internal region surrounded by the front end, the rear end and the outer circumferential part, wherein the rotation mechanism comprises:

a supply rotation port, for supplying the compressed air to the rotating body, provided in one of the front end and the rear end of the rotation mechanism and communicably connected with the rotation chamber, and a discharge rotation port, for discharging the compressed air, provided in the other of the front end and the rear end of the rotation mechanism and communicably connected with the rotation chamber;

wherein the rotating body is provided with a plurality of vanes and through-spaces between the vanes, the through-spaces extending through the rotating body in a direction of the shaft centerline;

whereby compressed air supplied to the rotation chamber through the supply rotation port hits the vanes, passes through the through-spaces between the vanes thereby rotating the rotating body, and is discharged through the discharge rotation port, and wherein the shaft member is supported to be capable of stroke movement, and the rotating body strokes with the shaft member.

5. The cylinder device according to claim 4, wherein a stroke mechanism portion for stroke movement of the shaft member includes a cylinder chamber divided from the rotation mechanism in the cylinder body, and the stroke mechanism portion is provided with a stroke port communicating with the cylinder chamber and allowing stroke movement of the shaft member by a supply and discharge of the fluid.

* * * * *